United States Patent
Vance et al.

(10) Patent No.: US 7,962,854 B2
(45) Date of Patent: Jun. 14, 2011

(54) SYSTEMS, METHODS AND COMPUTER PROGRAM PRODUCTS FOR DISPLAYING CONTENT ON MULTIPLE DISPLAY SCREENS USING HANDHELD WIRELESS COMMUNICATORS

(75) Inventors: Scott L. Vance, Cary, NC (US); Martin Trively, Cary, NC (US); Ardian Dhrimaj, Morrisville, NC (US); Yojak Vasa, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 923 days.

(21) Appl. No.: 10/968,770

(22) Filed: Oct. 19, 2004

(65) Prior Publication Data

US 2006/0085753 A1 Apr. 20, 2006

(51) Int. Cl.
*G06F 13/00* (2006.01)
*G06F 15/00* (2006.01)
(52) U.S. Cl. .................................. 715/753; 455/556.1
(58) Field of Classification Search .......... 715/736–738, 715/741–755, 758, 851–854, 810; 455/556.1, 455/575.1, 566
See application file for complete search history.

(56) References Cited

U.S. PATENT DOCUMENTS

| | | | |
|---|---|---|---|
| 6,199,076 B1 | 3/2001 | Logan et al. | |
| 6,208,373 B1 * | 3/2001 | Fong et al. | 348/14.16 |
| 6,473,631 B1 * | 10/2002 | Siddoway et al. | 455/575.1 |
| 6,529,584 B1 | 3/2003 | Ravago et al. | |
| 6,775,358 B1 | 8/2004 | Breitenbach et al. | |
| 7,092,735 B2 * | 8/2006 | Osann, Jr. | 455/556.1 |
| 2002/0066115 A1 | 5/2002 | Wendelrup | |
| 2002/0068600 A1 | 6/2002 | Chihara et al. | |
| 2004/0064573 A1 | 4/2004 | Leaning et al. | |
| 2004/0189701 A1 * | 9/2004 | Badt, Jr. | 345/753 |
| 2004/0204060 A1 * | 10/2004 | Makinouchi et al. | 455/556.1 |
| 2005/0232169 A1 | 10/2005 | McLaughlin et al. | |

(Continued)

FOREIGN PATENT DOCUMENTS

EP 1 213 896 A1 6/2002

(Continued)

OTHER PUBLICATIONS

"Notification of Transmittal of the International Search Report and the Written Opinion of the International Searching Authority, or the Declaration", "Written Opinion of the International Searching Authority" and "International Search Report", PCT/2005/014016, Aug. 24, 2005.

(Continued)

*Primary Examiner* — Cao "Kevin" Nguyen
(74) *Attorney, Agent, or Firm* — Myers Bigel Sibley & Sajovec

(57) ABSTRACT

Content displaying methods, systems and computer program products display first display content on a first display screen of a handheld wireless communicator, while simultaneously sending second display content that is different from the first display content, from the handheld wireless communicator to an external display screen. In videoconferencing applications, the second display content can include an image of the remote party, and the first display content can include an image of the user of the handheld wireless communicator and/or a camera image from the handheld wireless communicator. In displaying alphanumeric data, the first display content can include first alphanumeric data, and the second display content can include the first alphanumeric data and additional detail data concerning the first alphanumeric data.

18 Claims, 5 Drawing Sheets

U.S. PATENT DOCUMENTS

2006/0084450 A1  4/2006  Dam Nielsen et al.

FOREIGN PATENT DOCUMENTS

| EP | 1 271 286 A2 | 1/2003 |
| EP | 1 455 505 A1 | 9/2004 |
| JP | 2000-308033 | 11/2000 |
| JP | 2002-009968 | 1/2002 |
| JP | 2002-281121 | 9/2002 |
| JP | 2005-151446 | 6/2005 |
| JP | 2005-151446 | 9/2005 |

OTHER PUBLICATIONS

Dhrimaj et al., *System and Method Rendering Audio/Image Data on Remote Devices*, U.S. Appl. No. 10/968,771, filed Oct. 19, 2004.

First Chinese Office Action for Patent Application No. 200580035409.6 issued on Aug. 15, 2008 with an English translation.

First Office Action from Japanese Patent Office mailed on Aug. 27, 2010 for Japanese Patent Application No. 2007-536677.

\* cited by examiner

SYSTEMS, METHODS AND COMPUTER PROGRAM PRODUCTS FOR DISPLAYING CONTENT ON MULTIPLE DISPLAY SCREENS USING HANDHELD WIRELESS COMMUNICATORS

FIELD OF THE INVENTION

This invention relates to displaying of information, and more particularly to systems, methods and computer program products for displaying content on multiple display screens.

BACKGROUND OF THE INVENTION

Handheld wireless communicators are widely used for voice, data and/or multimedia communications. As used herein, the term "handheld wireless communicator" means a wireless communicator that is small enough to be cradled in an average size human hand during operation. Handheld wireless communicators include conventional cell phones, smart phones that may include voice, video text message, email and Web access capabilities, Personal Digital Assistants (PDA) with wireless communications capabilities, wireless pagers and Blackberry wireless handheld email devices, but excludes conventional laptop computers. As used herein, "handheld wireless communicator" also includes wearable wireless communicators that may be integrated into eyeglasses, a wristband, a backpack and/or other article of clothing. Handheld wireless communicators may have an operational surface area of about 50 square inches or less, and may include a display of about 30 square inches or less. In particular, some smart phones may have an operational surface area of about 20 square inches or less, and a display of about 12 square inches or less.

Although handheld wireless communicators have become ubiquitous, their small displays may make some applications cumbersome.

SUMMARY OF THE INVENTION

Content displaying methods, systems and computer program products according to exemplary embodiments of the present invention display first display content on a first display screen of a handheld wireless communicator, while simultaneously sending second display content that is different from the first display content, from the handheld wireless communicator to an external display screen. In some embodiments, the second content is different from, but contextually related to, the first content.

Some embodiments of the present invention may be used in videoconferencing applications. In particular, in some embodiments, a user of the handheld wireless communicator is videoconferenced with a remote party using the handheld wireless communicator. In these embodiments, the second display content that is sent to the external display screen comprises an image of the remote party. In some embodiments, the first display content that is displayed on the handheld wireless communicator comprises an image of the user of the handheld wireless communicator. In other embodiments, the first display content comprises an image that is generated by the handheld wireless communicator's camera during the videoconferencing. In yet other embodiments, the second display content further comprises audio content from the remote party.

Other embodiments of the present invention may be used for displaying alphanumeric data. In particular, in some embodiments, the first display content that is displayed on the handheld wireless communicator comprises first alphanumeric data and the second display content that is sent to the external display screen comprises the first alphanumeric data and additional detail data concerning the first alphanumeric data. More specifically, the first display content may comprise menu selections, and the second display content may comprise the menu selections and at least one submenu selection. In other embodiments, the first display content comprises presentation headings, and the second display content comprises the presentation headings and at least one presentation subheading. In still other embodiments, the second display content comprises a presentation, and the first display content comprises presenter notes related to the presentation.

DETAILED DESCRIPTION

Figure 1:
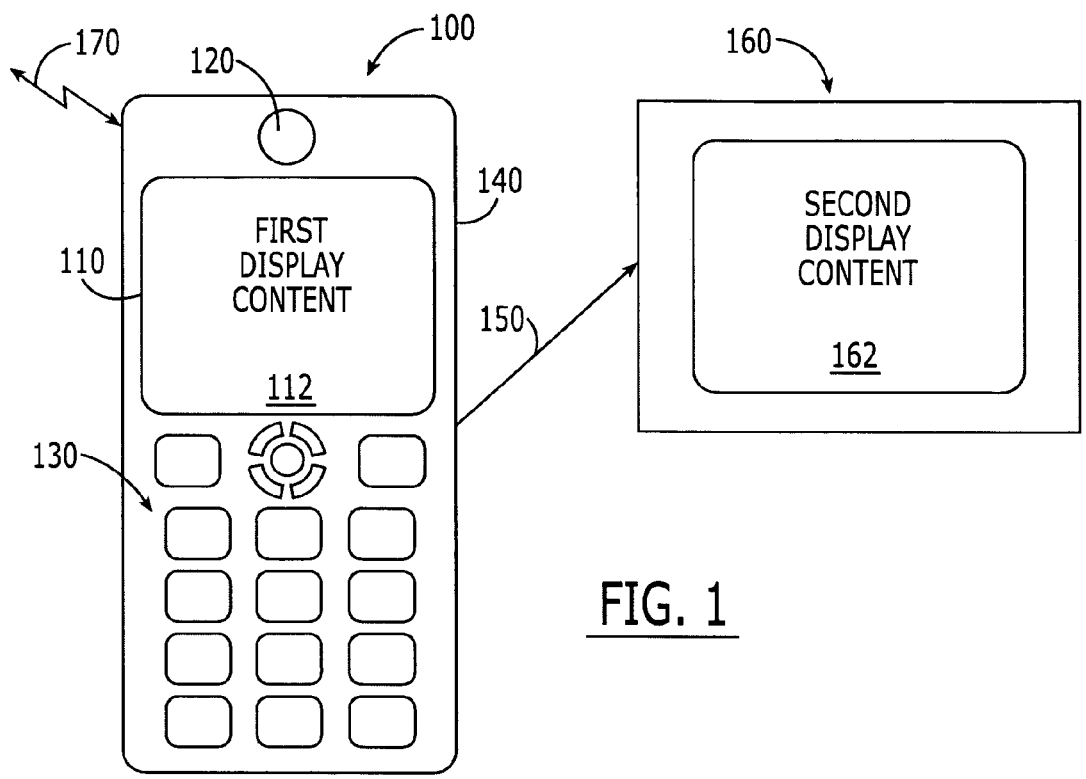
FIG. 1 is a block diagram of a handheld wireless communicator and an external display screen that are configured according to various exemplary embodiments of the present invention.

The present invention now will be described more fully hereinafter with reference to the accompanying drawings, in which illustrative embodiments of the invention are shown. In the drawings, the relative sizes of the first and second display screens may be exaggerated for clarity, whereas, in actual embodiments, the second display screen may be much larger than shown. This invention may be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items and may be abbreviated by "/".

It will also be understood that, although the terms first, second, etc. may be used herein to describe various elements, these elements should not be limited by these terms. These terms are only used to distinguish one element from another element. Thus, a first display screen discussed below could be termed a second display screen without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the present invention may be embodied as a method, device, system or computer program product. Accordingly, the present invention may take the form of an entirely hardware embodiment, an entirely software embodiment or an embodiment combining software and hardware aspects, all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the handheld wireless communicator or only partly on the handheld wireless communicator and partly on a remote computer. In the latter scenario, the remote computer may be connected to the handheld wireless communicator through a wired and/or wireless local area network (LAN) and/or wide area network (WAN), or the connection may be made to an external computer (for example, through the Internet using an Internet Service Provider).

The present invention is described in part below with reference to flowchart illustrations and/or block diagrams of methods, systems, devices and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a controller of a handheld wireless communicator to produce a handheld wireless communicator, such that the instructions, which execute via the controller of the handheld wireless communicator create means or modules for implementing the functions/acts specified in the flowchart and/or block diagram block or blocks.

These computer program instructions may also be stored in a computer-readable memory that can direct a the handheld wireless communicator to function in a particular manner, such that the instructions stored in the computer-readable memory produce an article of manufacture including computer-readable program code which implements the function/act specified in the flowchart and/or block diagram block or blocks.

The computer program instructions may also be loaded onto a handheld wireless communicator to cause a series of operational steps to be performed on the handheld wireless communicator to produce a computer implemented process such that the instructions which execute on the handheld wireless communicator provide steps for implementing the functions/acts specified in the flowchart and/or block diagram block or blocks.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 schematically illustrates content displaying methods, handheld wireless communicators and computer program products according to various exemplary embodiments of the present invention. As shown in FIG. 1, a handheld wireless communicator 100 includes a first display screen 110, a camera 120 and a keypad 130, in a housing 140 and is configured to provide wireless voice, data and/or multimedia communications 170. Although housing 140 is illustrated in FIG. 1 as a one-piece "brick" housing, multi-piece housings such as "clamshell" housings also may be provided. Wearable housings also may be provided. According to some embodiments of the present invention, first display content 112 is displayed on the first display screen 110 of the handheld wireless communicator 100, while simultaneously sending, via a wired and/or wireless link 150, second display content 162 that is different from the first display content 112, from the handheld wireless communicator 100 to an external display screen 160. The external display screen 160 may be a standalone display screen, such as a projector screen or TV monitor, or may be a display screen that is associated with a laptop, desktop or other computing device, that is larger than, and/or may have higher addressability than, the first display screen 110 of the handheld wireless communicator 100. In some embodiments, the second display content 162 is different from, but contextually related to, the first display content 112. Many exemplary embodiments will be described below.

Figure 2:
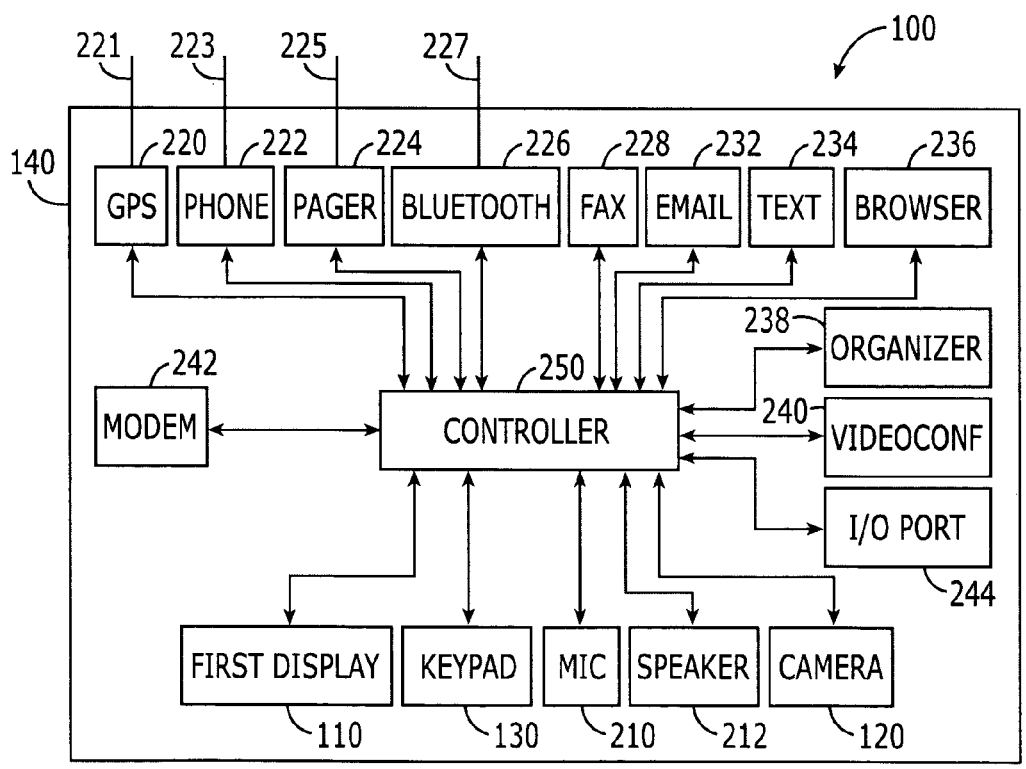
FIG. 2 is a block diagram of a handheld wireless communicator according to various embodiments of the present invention.

FIG. 2 is a simplified block diagram of a handheld wireless communicator, such as the handheld wireless communicator 100 of FIG. 1. A user interface includes the first display 110, the camera 120 and the keypad 130, and may also include a microphone 210 and a speaker 212. A Global Positioning System (GPS) receiver 220, a wireless radiotelephone 222, a pager 224, a short range wireless system, such as a Bluetooth system 226, a facsimile system 228, an email system 232, a text messaging system 234, a Web browser 236, an organizer 238 and/or a videoconference system 240 also may be provided. It will be understood that only some of these elements may be provided and that one or more of these elements may be integrated or combined in whole or in part. The GPS receiver 220, wireless radiotelephone 222, pager 224 and short range wireless system 226 may include separate antennas 221, 223, 225 and 227, respectively, or one or more of these antennas may be combined. The handheld wireless communicator 100 may also include a wireless or wired modem 242, and a wired I/O port 244 also may be provided. The design of the individual blocks of FIG. 2 as described in this paragraph are well known to those having skill in the art, and need not be described further herein.

A controller 250 also is provided for controlling some or all of the blocks of FIG. 2. The controller 250 may be embodied as systems (apparatus), methods and/or computer program products. Accordingly, the present invention may take the form of an entirely hardware embodiment, an entirely software embodiment, or an embodiment combining software and hardware aspects. The controller may be designed to provide the functionality described in FIGS. 1 and 3-10, in addition to conventional functions of controlling the various elements of FIG. 2.

Referring again to FIGS. 1 and 2, some embodiments of the present invention can provide a controller 250 that is configured to display first display content 112 on the first display screen 110 of the handheld wireless communicator 100, while simultaneously sending the second display content 162 that is different from the first display content 112, from the handheld wireless communicator 100 to the external display screen 160 using the short range wireless system 226, the modem 242, the email system 232, the text messaging system 224, the browser 236 and/or the I/O port 244, to provide the wired and/or wireless link 150. For example, the short range wireless system 334 can provide a wireless link 150 between the handheld wireless communicator 100 and the external display screen 160, whereas the modem 242 and/or the I/O port 244 can provide a wired link 150 between the handheld wireless communicator 100 and the external display screen 160.

Figure 3:
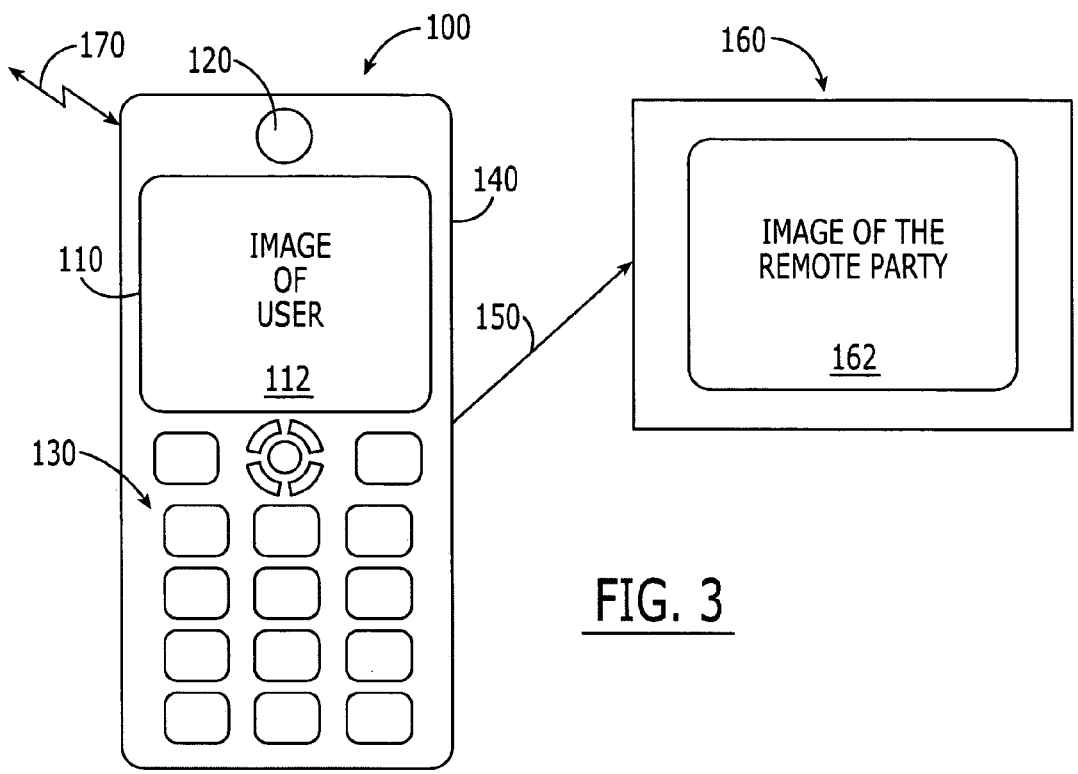
FIGS. 3-8 are block diagrams of a handheld wireless communicator and an external display screen that are configured according to various other exemplary embodiments of the present invention.
Figure 4:
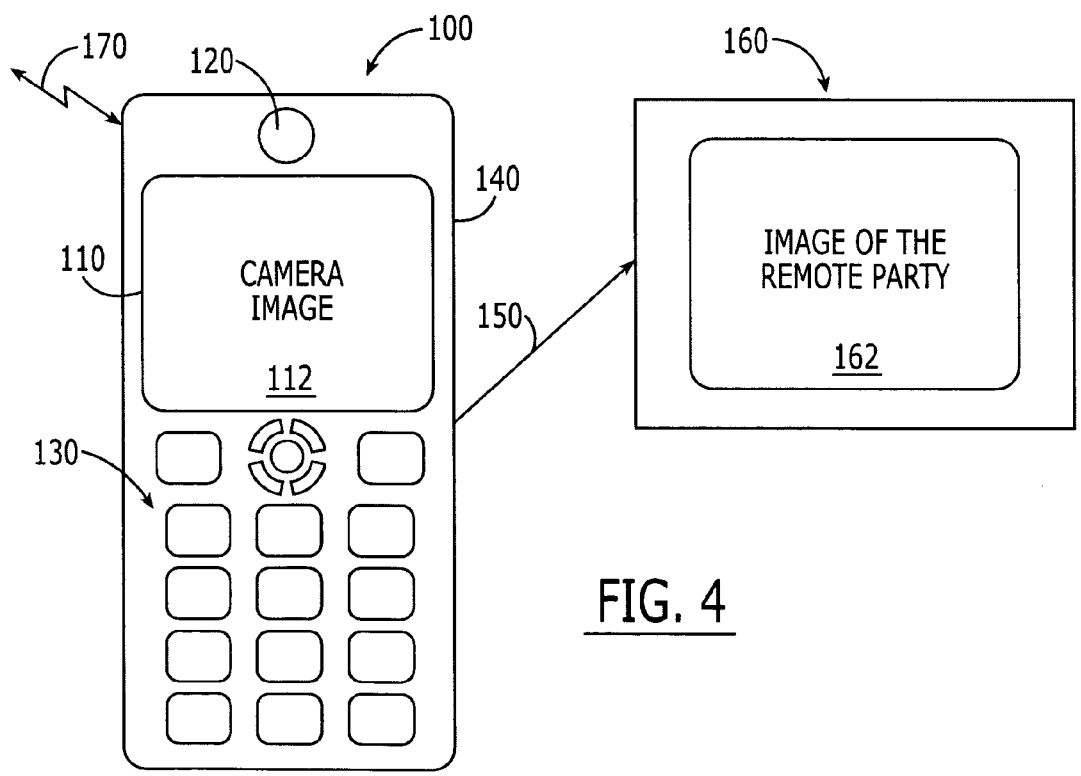

FIG. 3 illustrates embodiments of the present invention for use in videoconferencing. In videoconferencing, a videoconferencing module, such as the videoconferencing module 240 of FIG. 2, may be used to videoconference a handheld wireless communicator 100 with a remote party. As shown in FIG. 3, in videoconferencing embodiments, the second display content 162 on the second display screen 160 can comprise an image of the remote party. Moreover, in some embodiments, as shown in FIG. 3, the first display content 112 on the first display screen 110 can comprise an image of the user of the handheld wireless communicator that may be obtained from the camera 120. In still other embodiments, as shown in FIG. 4, the first display content 112 can comprise an image that is generated by the camera 120 during the videoconferencing. In yet other embodiments, call related information and/or other information may be displayed on the first display screen 110, if a camera 120 is not available and/or the user chooses not to use the camera image. In still other embodiments, audio content from the remote party also may be conveyed to and played at the second display 160. Embodiments of FIGS. 3 and 4 also may be combined.

Figure 5:
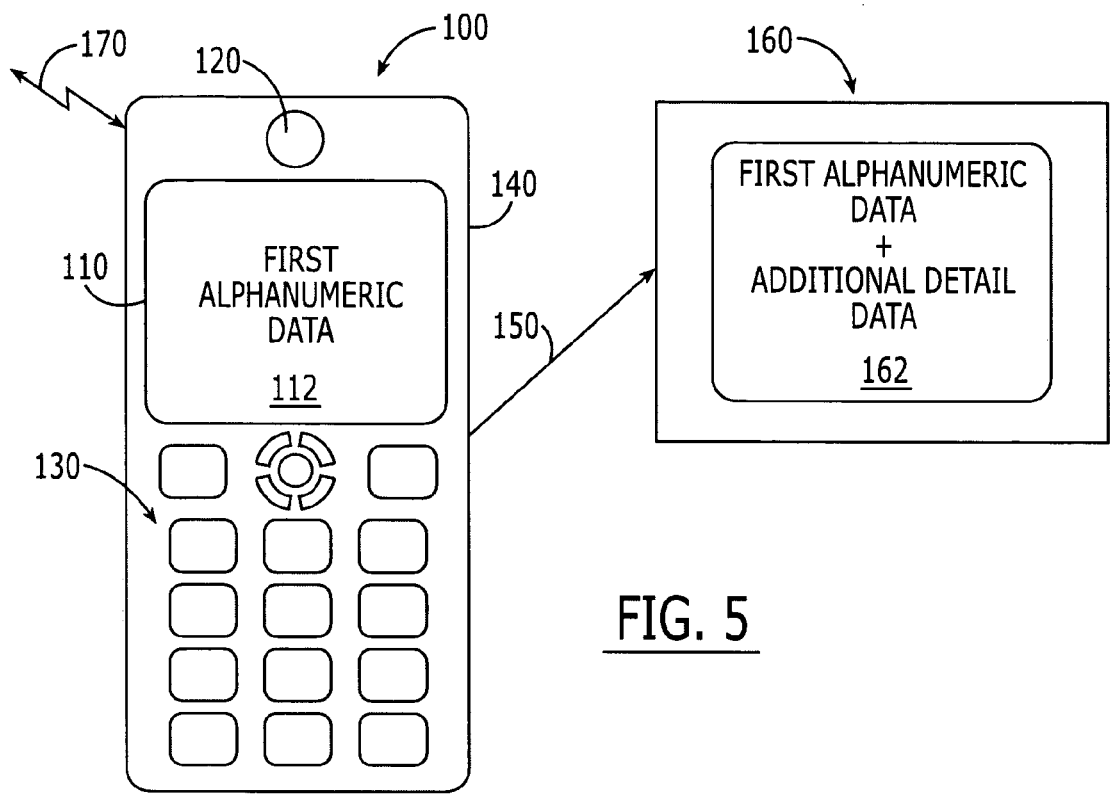
Figure 6:
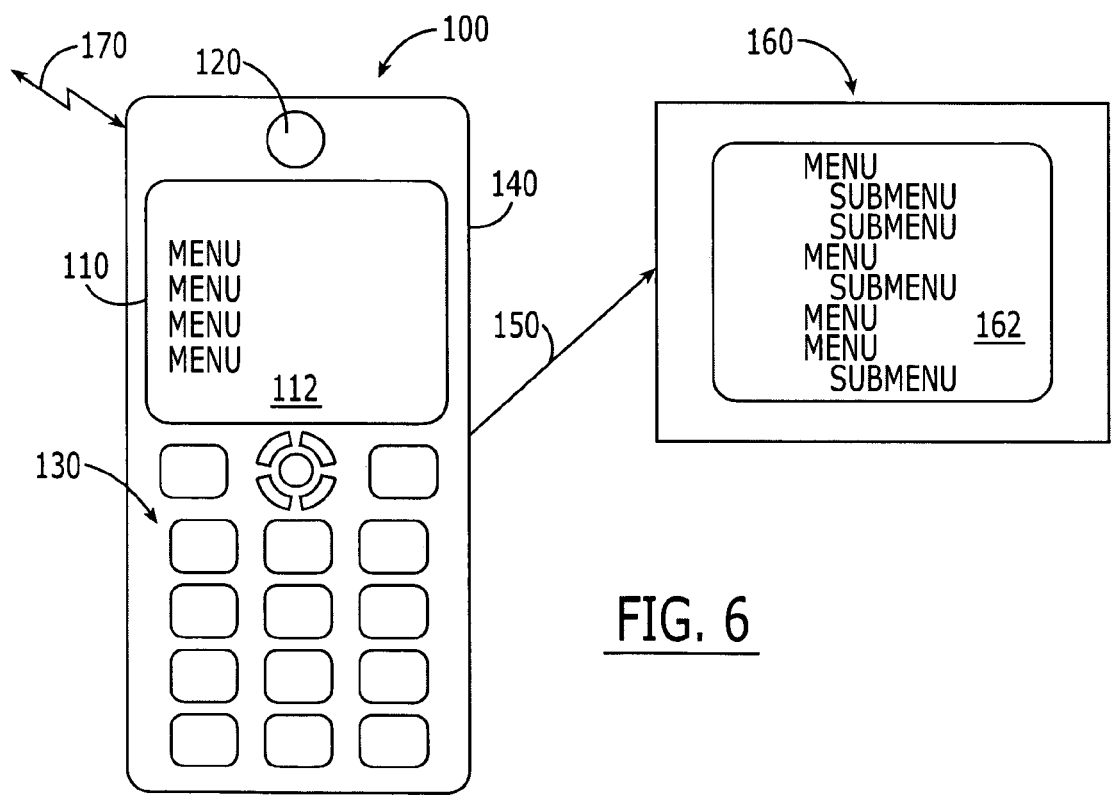
Figure 7:
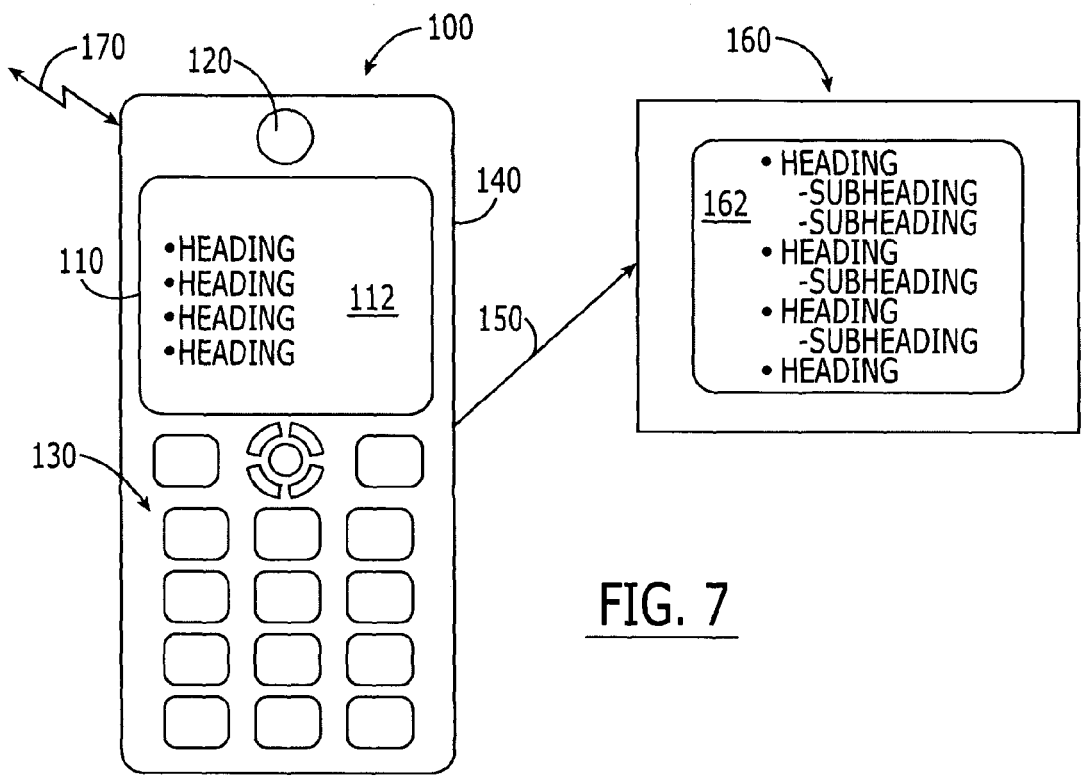
Figure 8:
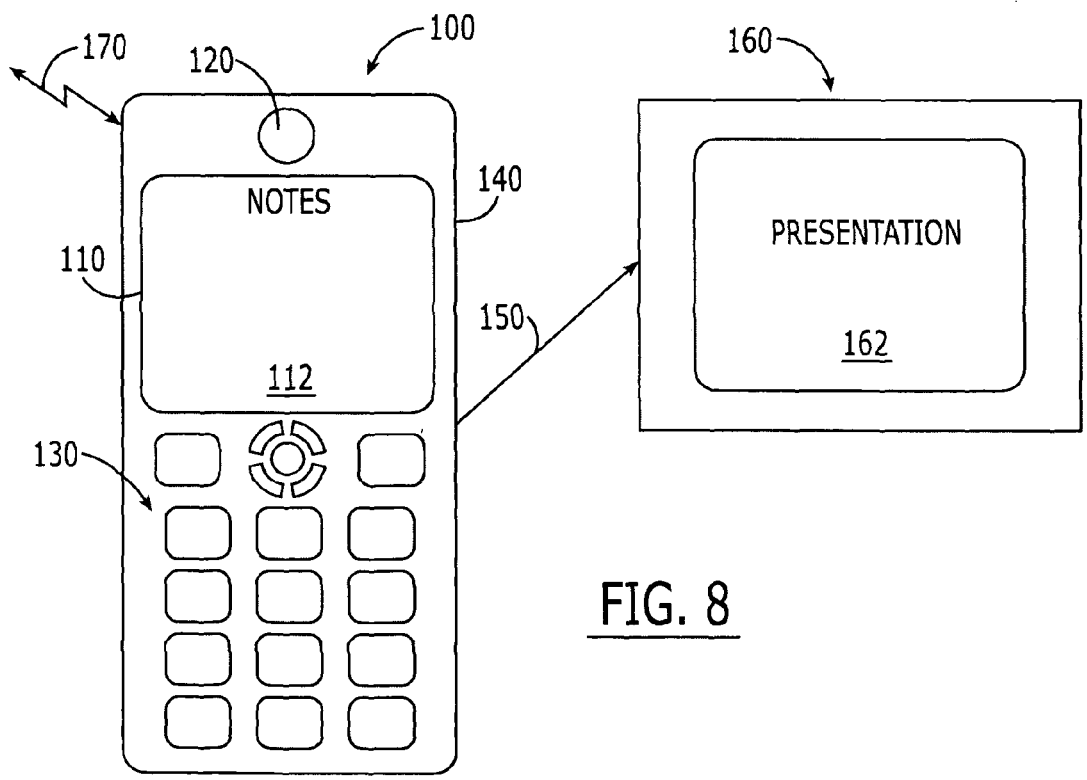

FIG. 5 illustrates embodiments of the present invention that may be used during data display. In these embodiments, the first display content 112 that is displayed on the first display 110 comprises first alphanumeric data, and the second display content 162 that is displayed on the external display 160 comprises the first alphanumeric data and additional detail data concerning the first alphanumeric data. In some embodiments, as shown in FIG. 6, the first display content 112 comprises menu selections, and the second display content 162 comprises the menu selections and at least one submenu selection. In FIG. 7, first display content 112 comprises presentation headings (commonly referred to as presentation "bullets"), and the second display content 162 comprises the presentation headings and at least one presentation subheading. In other embodiments, as shown in FIG. 8, the second display content 162 comprises a presentation, and the first display content 112 comprises presenter notes related to the presentation.

Accordingly, in the videoconferencing and alphanumeric data display applications, both the first display screen 110 of the handheld wireless communicator 100 and the external display screen 160 can display different images, each of which is suitable for the respective size, resolution and/or addressability of the first display screen 110 and the external display screen 160. In videoconferencing, the image of the remote party (FIGS. 3 and 4) may be displayed on the external display screen at relatively high resolution/addressability and large size, whereas the camera image (FIG. 4) or image of the user (FIG. 3) may be displayed on the relatively small, relatively low resolution/addressability display 110 of the handheld wireless communicator 100. In data display applications, additional levels of detail (FIGS. 5-7) may be presented on the external display screen 160 relative to the display screen 110 of the handheld wireless communicator 100, or brief presenter notes may be presented on the first display screen 110 of the handheld wireless communicator 100 (FIG. 8).

Additional discussion of videoconferencing embodiments of the present invention (FIGS. 1-4) now will be provided. In these embodiments, when the handheld wireless communicator 100 receives or initiates a video call, the remote party can be displayed automatically on a larger display screen 160, with the handheld wireless communicator display screen 110 switching to monitoring the local view/camera. A user selectable switch, which may be a hard and/or soft switch, can allow for switching the external display screen 160 on and off. Thus, when a video call is connected, the first display screen 110 of the handheld wireless communicator 100 can display the remote party, as well as a camera image in a corner of the display screen 110, as is conventional. However, upon user selection, the image of the remote party may be sent to the external display screen 160, while the first display screen 110 of the handheld wireless communicator 100 displays the image of the user (FIG. 3) or the camera image (FIG. 4).

Figure 9:
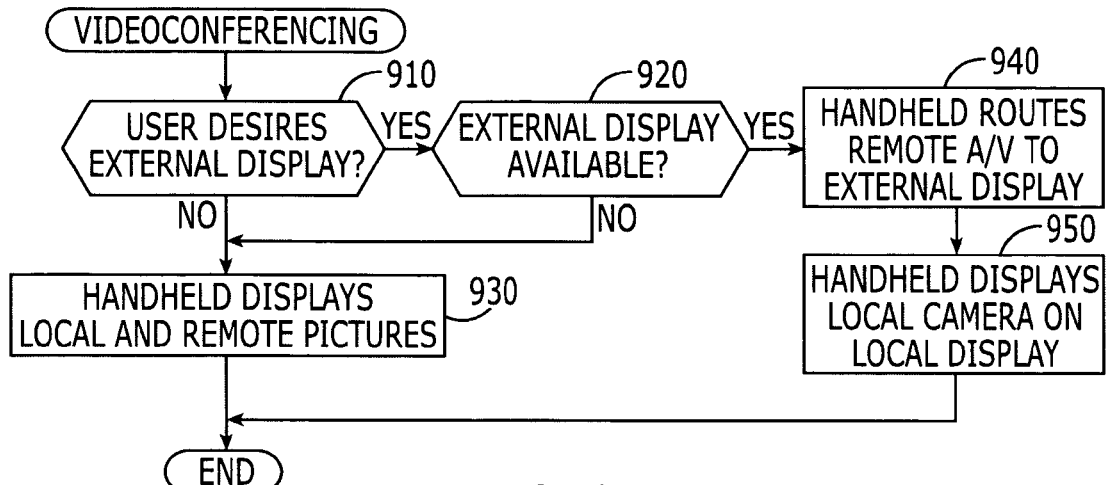
FIGS. 9 and 10 are flowcharts of operations that may be performed according to various exemplary embodiments of the present invention.

FIG. 9 is a flowchart of operations that may be used for videoconferencing according to exemplary embodiments of the present invention. As shown in FIG. 9, when videoconferencing begins (by receiving or initiating a videoconference call), a determination is made at Block 910 as to whether the user of the handheld wireless communicator desires to use an external display screen. This determination may be made by user selection of a preference and/or in response to a default setting. If an external display screen 160 is desired, then at Block 920, a determination is made as to whether an external display screen 160 is available. If the user does not desire to use an external display screen or an external display screen is not available, then the handheld wireless communicator 100 displays the local and remote pictures in a conventional manner, as shown at Block 930. Alternatively, if the user desires to use an external display screen, and an external display screen 160 is available, then at Block 940, the handheld wireless communicator routes the remote video information to the external display screen 160, while simultaneously, at Block 950, displaying the local camera and on the local display screen.

It will be understood that, in Block 940, when the video is routed to the external display screen 160, it may also be desirable for the audio to be routed to the external display screen 160 for better intelligibility. Alternatively, a user may be allowed to select whether audio is to remain at the handheld wireless communicator 100 and/or to be routed to the external display screen 160. It also will be understood that the external display screen 160 for displaying the remote party can be a conventional display device that can include a generic adapter that can allow the use of display devices that are usually found in households or businesses. These adapters can include an audiovisual adapter, video plus audio adapters and/or adapters that can multiplex the audiovisual data onto a single digital link, such as a Firewire link. Multiple remote parties can be displayed on the larger external display screen 160 with varied visibility.

Additional discussion of alphanumeric data displaying (FIGS. 1-2 and 5-8) now will be provided. In particular, display screens 110 on handheld wireless communicators 100 conventionally are relatively small, and may be QVGA or lower in resolution/addressability. For certain applications, such as Microsoft PowerPoint™ or other presentations, the handheld wireless communicator 100 can output higher resolution/addressability images to an external device 160 for display according to some embodiments of the present invention. Accordingly, in some embodiments of the present invention, the handheld wireless communicator 100 can have multiple images associated with a particular presentation screen or topic. These images may be different, in that the alphanumeric data detail level is different on these two screens (FIGS. 5-7), or the data may be different but contextually related (FIG. 8). An example of different detail level would be a screen having, for example, 20 menu selections on a high resolution external display screen 160, such as a TV or video monitor, whereas the handheld wireless communicator 100 may show only four menu selections, and use scrolling to show the other selections. An example of different content may be a PowerPoint presentation wherein the presentation slides are sent to the external display screen, whereas only the speaking points or main bullets are displayed on the handheld wireless communicator 100.

Figure 10:
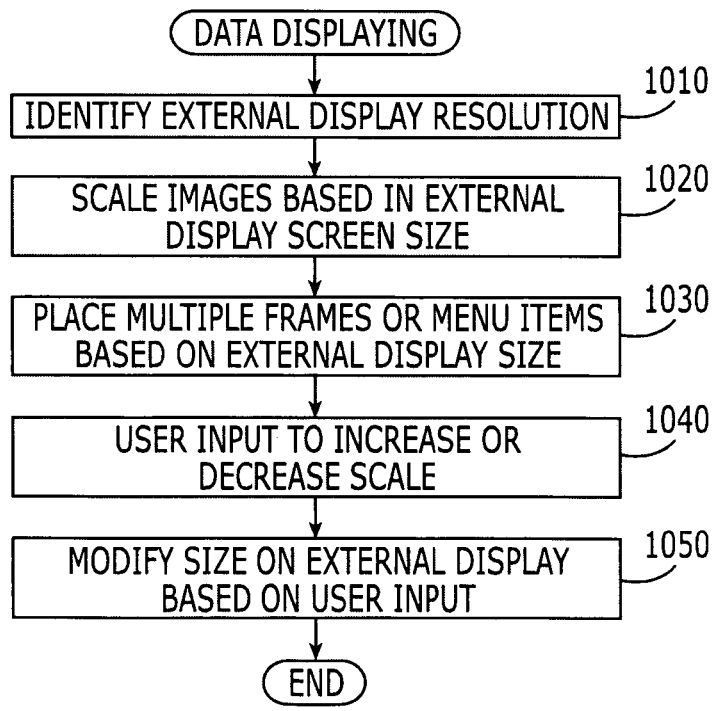

FIG. 10 is a flowchart of operations for displaying data on an external display screen 160 according to various embodiments of the present invention. In response to a user indication that a user desires to use an external display screen and an indication that an external display screen is available, which may be similar to Blocks 910 and 920 of FIG. 9, the resolution of the external display screen is identified at Block 1010. The image is then scaled at Block 1020 based on the external display screen size. The user may elect, at Block 1030, to place multiple frames or menu items in the image based on the external display screen size. The user may also provide an input at Block 1040 to increase or decrease the scale. Finally, at Block 1050, the size of the image on the external display is modified based on the user input.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A videoconferencing method comprising:
videoconferencing a user of a handheld wireless communicator with a remote party using the handheld wireless communicator, wherein the handheld wireless communicator also includes a display screen and a camera;
displaying an image that is generated by the camera on the display screen of the handheld wireless communicator while simultaneously sending an image of the remote party from the handheld wireless communicator to an external display screen, during the videoconferencing; and
displaying alphanumeric data on the display screen of the handheld wireless communicator while simultaneously displaying the alphanumeric data and additional detail data concerning the alphanumeric data on the external display screen.

2. A method according to claim 1 wherein the image that is generated by the camera comprises an image of the user of the handheld wireless communicator.

3. A method according to claim 1 wherein videoconferencing further comprises sending audio of the remote party from the handheld wireless communicator to an external speaker.

4. A method according to claim 1 wherein videoconferencing further comprises sending audio of the remote party from the handheld wireless communicator to an external speaker of the external display screen.

5. A method according to claim 1 further comprising:
scaling the image of the remote party to conform to a resolution of the external display screen.

6. A method according to claim 1 wherein the alphanumeric data comprises menu selections and wherein the additional detail data concerning the alphanumeric data comprises the menu selections and at least one submenu selection.

7. A method according to claim 1 wherein the alphanumeric data comprises a first number of menu selections and wherein the additional detail data concerning the alphanumeric data comprises a second number of menu selections, which is larger than the first number.

8. A method according to claim 1 wherein the alphanumeric data comprises presentation headings and wherein the additional detail data concerning the alphanumeric data comprises the presentation headings and at least one presentation subheading.

9. A handheld wireless communicator comprising:
a handheld wireless communicator housing;
a first display screen in the housing;
a camera in the housing; and
a videoconferencing controller that is configured to videoconference a user of the handheld wireless communicator with a remote party using the handheld wireless communicator and to display an image that is generated by the camera on the first display screen while simultaneously sending an image of the remote party from the handheld wireless communicator to a second display screen that is external of the handheld wireless communicator, during the videoconferencing,
wherein the controller is further configured to display alphanumeric data on the display screen of the handheld wireless communicator while simultaneously displaying the alphanumeric data and additional detail data concerning the alphanumeric data on the external display screen.

10. A handheld wireless communicator according to claim 9 wherein the image that is generated by the camera comprises an image of the user of the handheld wireless communicator.

11. A handheld wireless communicator according to claim 9 wherein the videoconferencing controller is further configured to send audio of the remote party from the handheld wireless communicator to a speaker that is external of the handheld wireless communicator.

12. A handheld wireless communicator according to claim 9 wherein the second display screen further comprises a speaker and wherein the videoconferencing controller is further configured to send audio of the remote party from the handheld wireless communicator to the speaker.

13. A handheld wireless communicator according to claim 9 wherein the videoconferencing controller is further configured to scale the image of the remote party to conform to a resolution of the second display screen.

14. A videoconferencing computer program product comprising a computer-readable storage medium having computer-readable program code embodied in the medium, the computer-readable program code comprising:
computer-readable program code that is configured to videoconference a user of a handheld wireless communicator with a remote party using the handheld wireless communicator, wherein the handheld wireless communicator also includes a display screen and a camera;

computer-readable program code that is configured to display an image that is generated by the camera on the display screen of the handheld wireless communicator while simultaneously sending an image of the remote party from the handheld wireless communicator to an external display screen, during the videoconferencing, and computer readable program code that is configured to display alphanumeric data on the display screen of the handheld wireless communicator while simultaneously displaying the alphanumeric data and additional detail data concerning the alphanumeric data on the external display screen.

15. A computer program product according to claim 14 wherein the image that is generated by the camera comprises an image of the user of the handheld wireless communicator.

16. A computer program product according to claim 14 wherein the computer-readable program code that is configured to videoconference further comprises computer-readable program code that is configured to send audio of the remote party from the handheld wireless communicator to an external speaker.

17. A computer program product according to claim 14 wherein the computer-readable program code that is configured to videoconference further comprises computer-readable program code that is configured to send audio of the remote party from the handheld wireless communicator to an external speaker of the external display screen.

18. A computer program product according to claim 14 further comprising:

computer-readable program code that is configured to scale the image of the remote party to conform to a resolution of the external display screen.

* * * * *